P. AUGER.
AMUSEMENT VEHICLE.
APPLICATION FILED AUG. 23, 1911.
1,014,279.
Patented Jan. 9, 1912.
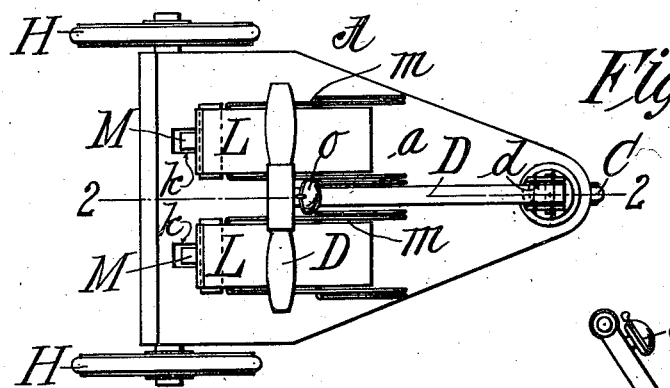
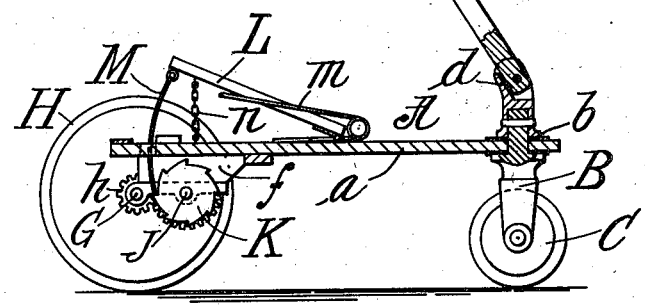
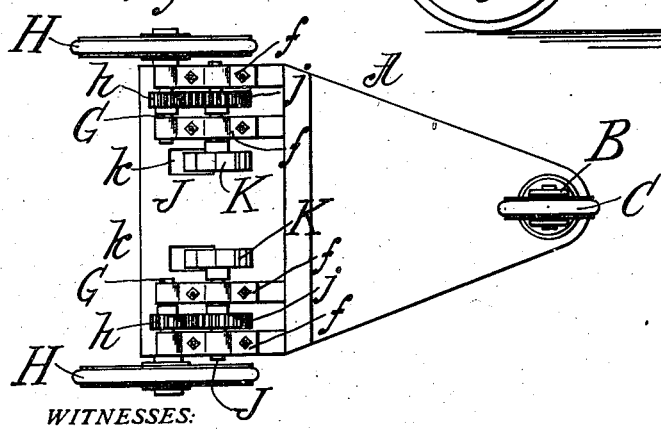
WITNESSES:
R. M. Mowry.
Elliott W. Beach.
INVENTOR,
Philibert Auger,
BY
ATTORNEY.

UNITED STATES PATENT OFFICE.

PHILIBERT AUGER, OF EASTHAMPTON, MASSACHUSETTS.

AMUSEMENT-VEHICLE.

1,014,279.      Specification of Letters Patent.      Patented Jan. 9, 1912.

Application filed August 23, 1911. Serial No. 645,620.

*To all whom it may concern:*

Be it known that I, PHILIBERT AUGER, a citizen of the United States of America, and resident of Easthampton, in the county of Hampshire and State of Massachusetts, have invented certain new and useful Improvements in Amusement-Vehicles, of which the following is a full, clear, and exact description.

This invention relates to amusement vehicles designed principally for use by children; and the same comprises a frame or platform mounted on a pair of rear wheels and a central front steering wheel to which an upstanding steering and steadying handle is connected, a pair of pedals on which a person may stand and operate, by an alternated treading action, the gearing individually provided in connection with each of the rear traction wheels.

By use of these vehicles children may enjoy themselves on roller coasts, halls, parks and smooth pavements, either alone or in competition.

The invention is described in conjunction with the accompanying drawings and is set forth in the claims.

In the drawings:—Figure 1 is a plan view of the vehicle; Fig. 2 is a central sectional view as taken on line 2—2, Fig. 1; Fig. 3 is an inverted plan view of the vehicle.

Similar characters of reference indicate corresponding parts in all of the views.

In the drawings, A represents the frame, the greater portion of which is comprised in a platform $a$ in a forward central part of which is the fork B having the steering wheel C mounted therein and having an upwardly projecting stem $b$ which is swiveled through and extended above the forward portion of the platform and provided with a limiting stop $d$ at its rear upper part. Such upper part of the stem is made bifurcated for the pivotal connection therein of an operating T-shaped handle D. This handle is adapted to be normally upwardly and rearwardly inclined, as shown in Fig. 2, and to have its inclination limited by the said stop $d$ so as to always be approximately in position to be grasped by the rider.

The frame comprises the pairs of hangers $f$ $f$ at its rear portion in which are journaled separate horizontal transverse shafts G, G, in alinement, which shafts have, each, one of the traction wheels H thereon, and also each a gear wheel $h$ affixed thereon; and forward of and parallel with the traction wheels' shafts G G are countershafts J J suitably journaled in the hangers, and having each a gear wheel $j$ which is in mesh with the adjacent gear wheel $h$ on the traction wheel shaft. There is, moreover, affixed on each countershaft J a ratchet wheel K made with coarse teeth; and on the top of the platform a pair of pedals L, L, are hinged at their forward ends and have pivotally connected thereto at their rear end portions the depending pawls M which extend through suitable apertures $k$ therefor in the platform and coact with the ratchet wheels.

$m$ represents springs for returning the pedals to their normal upper positions after being foot depressed; and in order that the pedals may not be thrown upwardly beyond proper limits so that the pawls would become disengaged from the ratchet wheels, chains or like flexible connections $n$ are secured to the platform and to the pedals as indicated in Fig. 2.

It will be noted in Fig. 1 that there is space on the platform outside of the pedals on which a person may stand when not standing on either or both of the pedals.

For the propulsion of the vehicle a person will stand on the pedals and with the weight first on one and then on the other will alternately operate them to give correspondingly alternated impulses through the pawl and ratchet actuated gearing to the traction wheels; and when desiring to check the speed, the rider may, through the steering handle D, turn the steering wheel at right angles to the course of travel, and when coasting the rider may have standing room on the platform oppositely outside of the pedals.

When the device is in disuse, for compact stowage, the fork and steering handle may be turned half way around so that the stop D has a forward disposition and then the steering handle may be swung down to a level position centrally along the platform between the pedals.

$o$ represents an alarm bell mounted on the handle; and the wheels C and H, H, may be equipped with rubber tires.

I claim:—

1. In an amusement vehicle, in combination, a frame including a platform, a steering wheel swiveled at the front of the platform and having an operating handle, separate transverse shafts in alinement at the rear portion of the platform having each a traction wheel and a gear wheel affixed thereon, a pair of countershafts having each a gear wheel in mesh with the gear wheel on the traction wheel shaft and a ratchet wheel, a pair of hinged pedals on the top of the platform, pawls connected with and depending from said pedals and coacting with the ratchet wheels, and springs for elevating the pedals.

2. In an amusement vehicle, in combination, a frame including a platform, a steering wheel swiveled at the front of the platform and having an operating handle, separate transverse shafts in alinement at the rear portion of the platform having traction wheels and gear wheels affixed thereon, a pair of countershafts having each a gear wheel in mesh with the gear wheel on the traction wheel shaft and a ratchet wheel, a pair of hinged pedals on the top of the platform, pawls connected with and depending from said pedals and engaging with the ratchet wheels, springs for elevating the pedals, and flexible connections secured to the platform and to the pedals for limiting the upward swinging movements of the latter.

Signed by me at Springfield, Mass., in presence of two subscribing witnesses.

PHILIBERT AUGER.

Witnesses:
 WM. S. BELLOWS,
 G. R. DRISCOLL.